United States Patent [19]
Jouppi et al.

[11] Patent Number: 5,787,465
[45] Date of Patent: Jul. 28, 1998

[54] DESTINATION INDEXED MISS STATUS HOLDING REGISTERS

[75] Inventors: Norman P. Jouppi, Palo Alto; Ramsey W. Haddad, Cupertino, both of Calif.

[73] Assignee: Digital Equipment Corporation, Maynard, Mass.

[21] Appl. No.: 701,036

[22] Filed: Aug. 21, 1996

Related U.S. Application Data

[63] Continuation of Ser. No. 270,080, Jul. 1, 1994, abandoned.

[51] Int. Cl.$^6$ .............................. G06F 12/00; G06F 12/08
[52] U.S. Cl. ............. 711/117; 364/DIG. 1; 364/DIG. 2; 364/243.4; 711/3; 711/118; 711/146
[58] Field of Search ......................... 395/444, 445, 395/446, 451, 473, 458; 364/DIG. 1, DIG. 2, 243.4, 243.41; 711/117, 118, 131, 146, 3

[56] References Cited

U.S. PATENT DOCUMENTS

| | | | |
|---|---|---|---|
| Re. 34,052 | 9/1992 | Hester et al. | 395/375 |
| 4,370,710 | 1/1983 | Kroft | 395/455 |
| 4,646,233 | 2/1987 | Weatherford | 395/403 |
| 4,970,643 | 11/1990 | Cramm | 364/200 |
| 5,148,536 | 9/1992 | Witek et al. | 395/467 |
| 5,233,702 | 8/1993 | Emma et al. | 395/425 |
| 5,261,066 | 11/1993 | Jouppi | 395/425 |
| 5,295,253 | 3/1994 | Ducousso et al. | 395/425 |
| 5,377,345 | 12/1994 | Chang et al. | 395/445 |

OTHER PUBLICATIONS

Kroft, D., "Lookup-Free Instruction Fetch/Prefetch Cache Organization", 1981 IEEE, pp. 81–87.

"Memory Access Dependencies in Shared Memory Multiprocessors", M. Dubois and C. Scheurich, IEEE Trans. Software Eng., Jun. 1990.

"The Design of a Lookup-Free Cache", M. Dubois and c. Scheurich, IEEE, 1990, pp. 352–389.

"Lookup-Free Caches in High Performance Multiprocessors", C. Scheurich and M. Dubois, J. of Parallel and Distributed Computing, vol. 11, 1991, pp. 25–36.

Primary Examiner—Tod R. Swann
Assistant Examiner—Tuan V. Thai
Attorney, Agent, or Firm—Dirk Brinkman; A. Sidney Johnston; Alfred A. Stadnicki

[57] ABSTRACT

A hierarchical memory arrangement for use with a processor includes a cache, addressable by source addresses, and a set of processor registers, addressable by destination addresses. For each processor register there is a miss status holding registers. If the cache does not store data requested for one of the processor registers, a miss condition is generated. In response to the miss condition, the address of a cache block to contain the missing data is stored in the miss status holding register corresponding to the processor register for which the data are requested. While the requested data are transferred from a main memory to the cache, the cache is not locked up and additional data accesses are allowed.

12 Claims, 6 Drawing Sheets

F I G. I

DESTINATION INDEXED MISS STATUS HOLDING REGISTERS

This application is a continuation of application Ser. No. 08/270,080, filed Jul. 1, 1994, now abandoned.

FIELD OF THE INVENTION

This invention relates to computer systems, and more particularly to computer systems having hierarchically arranged memories including a cache memory.

BACKGROUND OF THE INVENTION

In a computer system, it is well known to arrange the memories for storing data in a hierarchical manner. For example, at a lowest level of the hierarchy, low cost slow-to-access bulk memories, such as disks, may be used to store persistent data. During operation of the computer system, portions of the persistent data may be stored in a more expensive, but faster semiconductor random access memory (RAM) arranged at an intermediate hierarchical level. Data requested for processing are usually held in a very small and high-speed cache memory. Data being processed are usually stored in very small specialized processor memories.

The specialized processor memories are usually arranged as registers and buffers, for example, general purpose registers, floating point registers, stack pointers, instruction registers, write buffers, and so forth. The registers are generally directly coupled to, and co-resident with the processor. Thus, the effective throughput of the computer system can be improved.

Most cache memories organize data in "lines" or blocks to exploit spatial and temporal localities of the data. A block can be multiple words, and each word can be multiple bytes. Access to a particular byte or word usually causes the entire block containing the byte or word to be transferred from the RAM to the cache memory. The cache memory can be partitioned into an instruction cache and a data cache to separately maintain, respectively, instructions and data consumed by the instructions.

It is a problem in the design of hierarchical memories to deal with the condition where data requested by the processor are missing from the cache memory. This condition is known as a "miss."

A large majority of prior art cache memories are arranged to "lock-up" the cache memory for any data access during a time interval beginning when a miss condition is detected until the data requested by the processor are stored in the cache memory. Execution may be suspended even though following instructions may not necessarily have an immediate requirement for the missing data. This may detrimentally effect the throughput of the computer system.

In one attempt to solve the problem of cache lock-up, the cache memory is provided with one or more miss status holding (MSH) registers. Each MSH register holds status information related to a "missing" cache block. In such an arrangement, the missing data are transferred to the cache memory from the RAM while processing continues on other instructions. The requested data can be stored in the appropriate processor registers upon completion of the transfer, using the status information stored in the MSH register.

Obviously, the number of MSH registers determines the number of missing blocks that can concurrently be tolerated. Once all of the MSH registers have been allocated to misses, a miss to an additional block will require a suspension of processor activities.

Although such a lock-up free cache memory can minimize the adverse effect of primary misses, a secondary miss may still lock-up the cache memory. A secondary miss can occur when there is a cache reference to a block already in the process of being transferred for an earlier primary miss.

A typical known MSH register can include a block allocated field and a block address field. The block allocated field indicates whether or not the MSH register is holding valid status information for a block being transferred. The block address field holds the address of the cache memory where the missing block is to be stored. Typically, the block address field of each MSH register is coupled to its own comparator to enable an associative search of a set of MSH registers for a source address of cache blocks.

In addition, each MSH register includes multiple "word" fields. Each word field, by its relative position in the MSH register, implicitly addresses specific missing data of the cache block. The word fields typically include three sub-fields, a valid sub-field, a destination sub-field, and a format sub-field. The valid sub-field indicates that status information stored in the destination and format sub-fields is valid. The destination sub-field stores an address of the processor registers to receive the missing data. The format sub-field indicates how the data are to be stored in the destination register, for example, single byte, double word, floating-point, etc. By having multiple word fields, multiple misses to the same block can be merged into a single transfer request to the next lower level in the memory hierarchy.

During operation of a prior art lock-up free cache, in response to detecting a miss condition, an associative search is made of the MSH registers to determine if a transfer of the memory block storing the missing data is in progress. The search associatively matches the address of the source of the miss with the block addresses stored in the MSH registers. If the transfer of the missing block is not in progress, then, the block address is stored in the block address field of an unallocated MSH register, and the register address and data format are stored in appropriate word sub-fields. If an unallocated MSH register is not available, the cache memory is locked-up in any case. Otherwise, if the transfer of the missing block is in progress, the corresponding register address and format are stored in the appropriate word fields of the matching MSH register.

Upon completion of the block transfer, the set of MSH registers are associatively searched using the comparators, and the missing data can be supplied to the registers of the processor using the information stored in the register's destination and format sub-fields.

In another prior art MSH register design, also indexed by source address of the "missing" cache block, the word fields include four sub-fields, for example, a valid field, a destination sub-field, and a format field, as described above, and in addition, a word address field, e.g., here the address of the missing data within the block is explicitly referenced. In this type of arrangement, the cache memory does not lock up when more than one miss is outstanding to a given word in a block.

The number of MSH registers, and their associated comparators and control logic can be increased in size and in number to handle more concurrent misses. However, this would be at the expense of the amount of circuit space available for the cache memory if the MSH registers and cache memory are made co-resident, as would be the case in an efficient circuit design.

Therefore, there is a need for a memory organization which minimizes the likelihood of cache lock-up, without substantially increasing the size and number of MSH registers, and the complexity of the control logic for managing the MSH registers.

SUMMARY OF THE INVENTION

The invention in the broadest terms, instead of focussing on sources of cache misses, tracks the destinations of cache misses. In a computer system including a processor a hierarchical memory arrangement includes a main memory, a cache memory, and a set of processor registers. Data required for processing by the processor are requested from the cache memory at a source address and stored in one of the processor registers at a destination address. For each processor register there is a miss status holding register. If the cache does not store data requested for the processor registers, a miss condition is generated. In response to the miss condition, the source address of the missing cache data is stored in the miss status holding register corresponding to the processor register for which the data are requested. While the requested data are transferred from a main memory to the cache, the cache is not locked up and additional data transfers between the cache memory and the set of processor registers are allowed.

In another aspect of the invention, each miss status holding register is associated with a corresponding format register. The format register stores the format of the data to be supplied to the processor register. In addition, the miss status holding registers store a valid condition, while the data requested by the processor are being transferred.

DETAILED DESCRIPTION OF A PREFERRED EMBODIMENT

Figure 1:
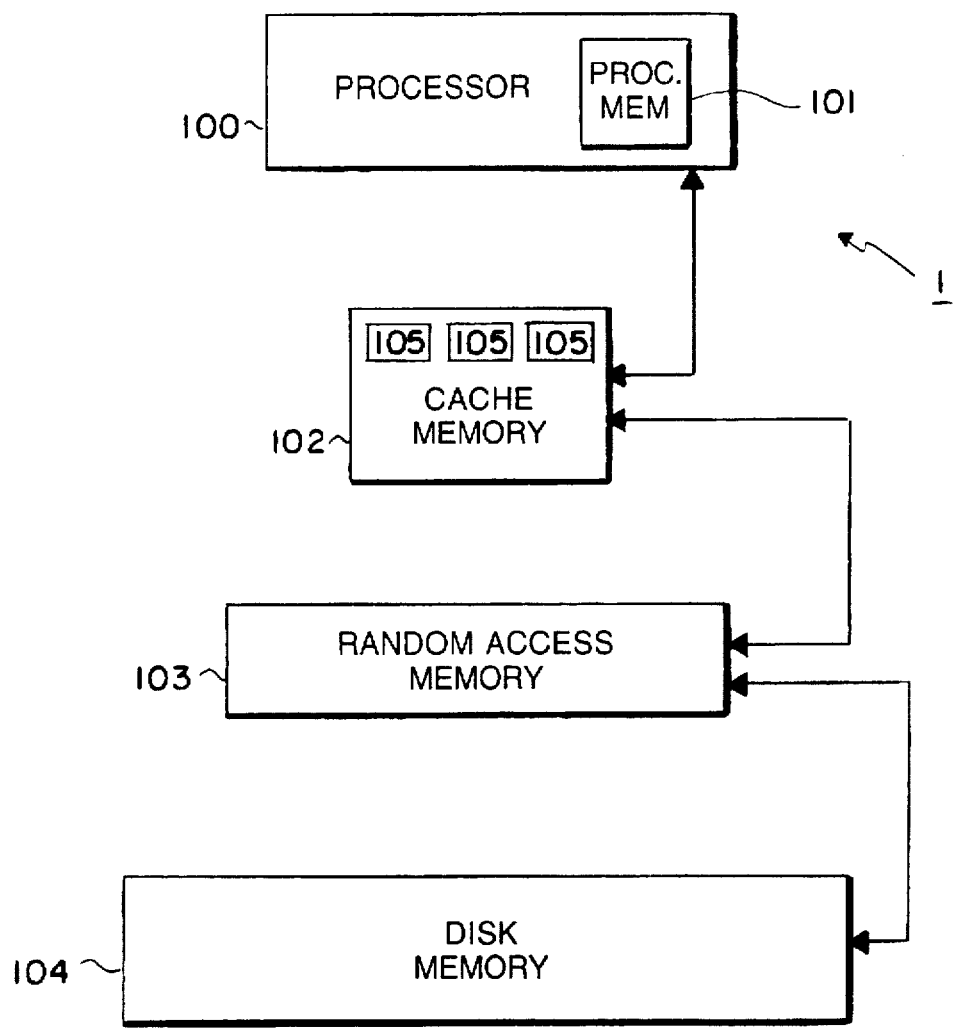
FIG. 1 is a data flow diagram of a computer system including hierarchical memories which can use the invention.

FIG. 1 shows a computer system 1 including a processor 100 and hierarchically arranged memories 101–104. The memories 101–104 can include, at a lowest level of the hierarchy, a bulk persistent memory 104, for example a disk. Intermediate levels of the hierarchy can include a random access main memory (RAM) 103 and a cache memory (cache) 102. At a highest level, there can be a processor memory 101. The components 100–104 are generally connected to each other by data, address, and control lines, not shown in FIG. 1.

The processor memory 101 generally is in the form of general purpose integer registers, floating point registers, special purpose registers, such as a program counter, stack pointers, instruction pre-fetch register, and write buffers for merging write data with data already stored in the cache 102. Typically, to increase throughput the registers are made co-resident with the processor 100.

The cache 102 can be organized as a plurality of "lines" or blocks 105, each block 105 can store a plurality of words of data. Each word, depending on the architecture of the computer system 1, can store one or more bytes of data. For example, in a 64 bit architecture, each word can include 8 eight-bit bytes, and four words can make a 32 byte block. Furthermore, the cache 102 can be partitioned to separately maintain instructions to be executed by the processor 100 and data consumed by the instructions during execution.

During operation of the computer system 1, the data flow is usually as shown by the directed arrows. Data can first be transferred from the disk 104 to the RAM 103. Data immediately requested by the processor 100 may be sourced from the cache 102. Data consumed by the processor 100 are usually maintained in the processor memory 101, e.g. the processor registers. After processing the data flow is usually in reverse, with the processed data ultimately stored in the disk 104 for persistent retention.

In order to minimize the problem of cache lock-up, as described above, the cache 102 in a preferred embodiment of the invention is provided with a set of "inverted" miss status holding (MSH) registers. The term "inverted" is used to contrast the MSH registers according to the invention with prior art MSH registers. In the prior art, each MSH register is associated with a source of the miss, e.g., a missing block, recall that the MSH registers of the prior art are associatively searched for block addresses.

In contrast, in the lock-up free cache of the invention, each MSH register is associated with a destination address of the requested data, hence "inverted." The destination addresses reference the processor memory 101, for example, the processor registers.

Figure 2:
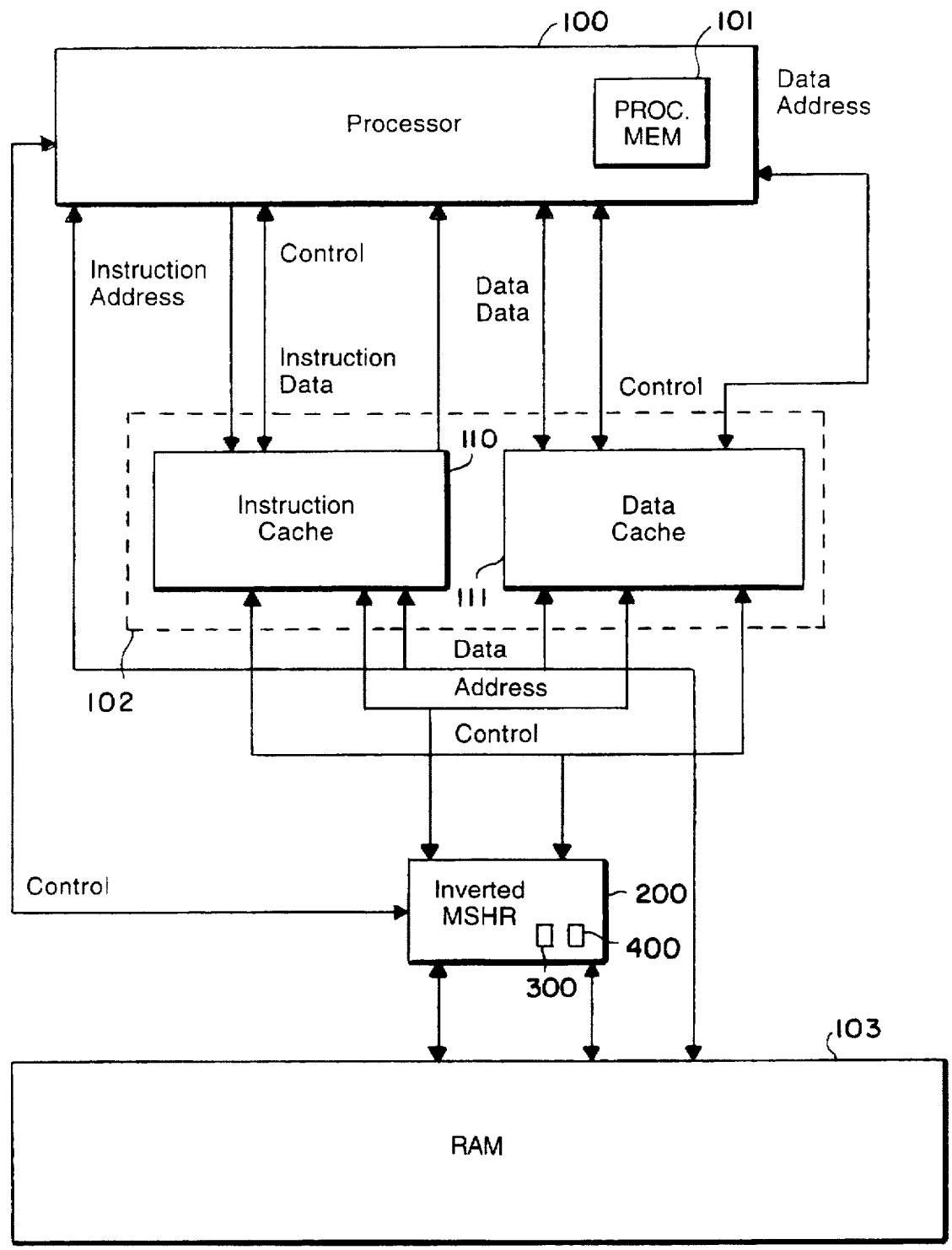
FIG. 2 is a block diagram of a portion of the computer system of FIG. 1.

FIG. 2 shows a portion of the computer system 1 coupled in a network by address, data, and control lines, including an inverted MSH register arrangement 200 configured in accordance with the invention. The arrangement 200 includes a set of inverted address MSH registers 300, and a set of inverted format MSH registers 400.

The cache memory 102 shown includes an instruction cache 110 and a data cache 111 respectively storing instructions and data. The processor memory 101, e.g., the registers, is shown as being co-resident with the processor 100. It should be understood that in some arrangements, some of the processor memory 101, such as the write buffers used for merging data, can be configured to be outside the processor 100.

Figure 3:
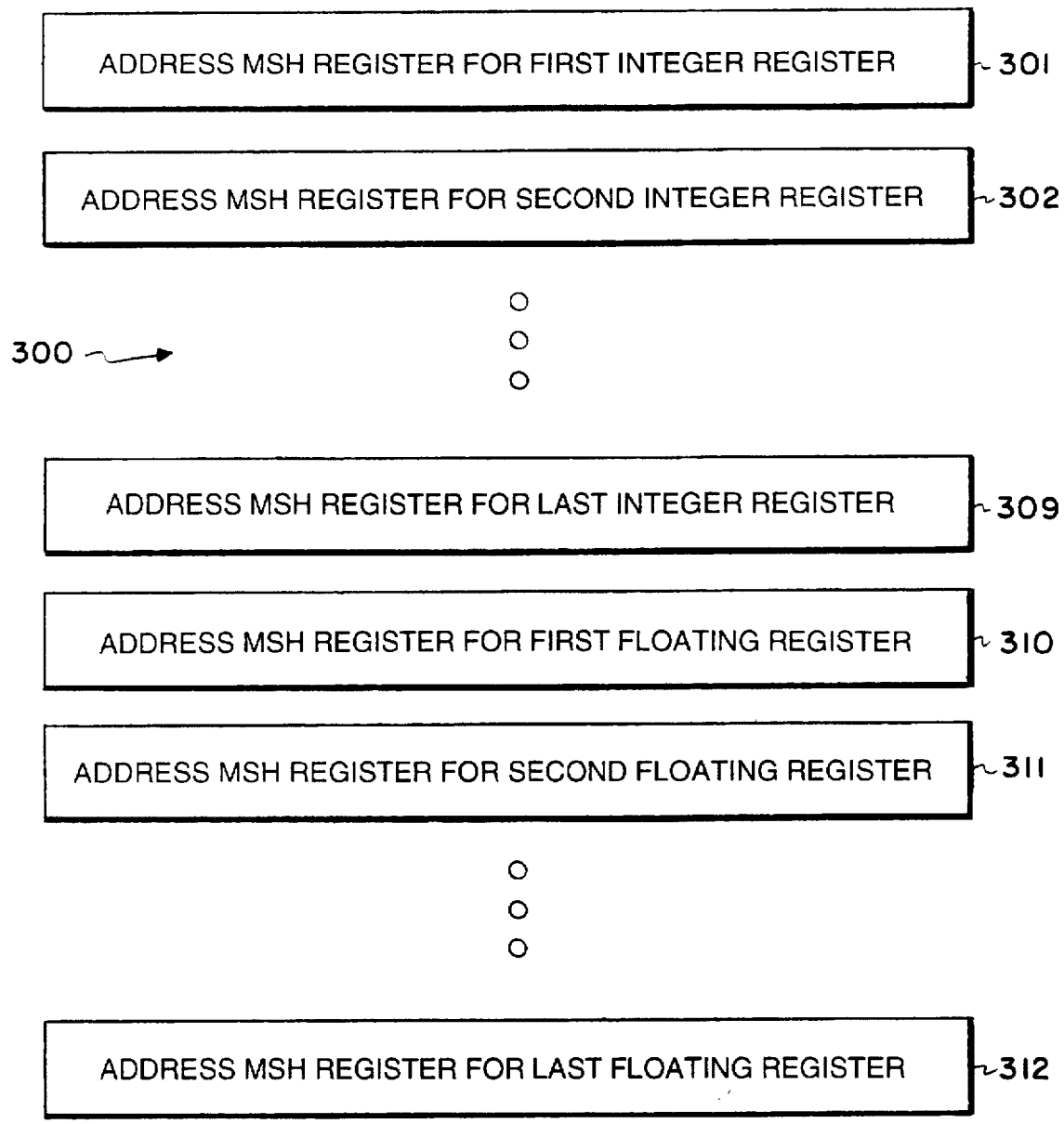
FIG. 3 is a block diagram of a set of inverted MSH registers according to the invention.

FIG. 3, in greater detail, shows some of the inverted address MSH registers 300. The set 300 can include address MSH register 301–319. Each address MSH register is associated with a destination address of the processor memory 101. For example, the MSH registers 301–309 are associated with corresponding general purpose integer registers. The MSH registers 310–319 are associated with corresponding general purpose floating point registers.

Figure 4:
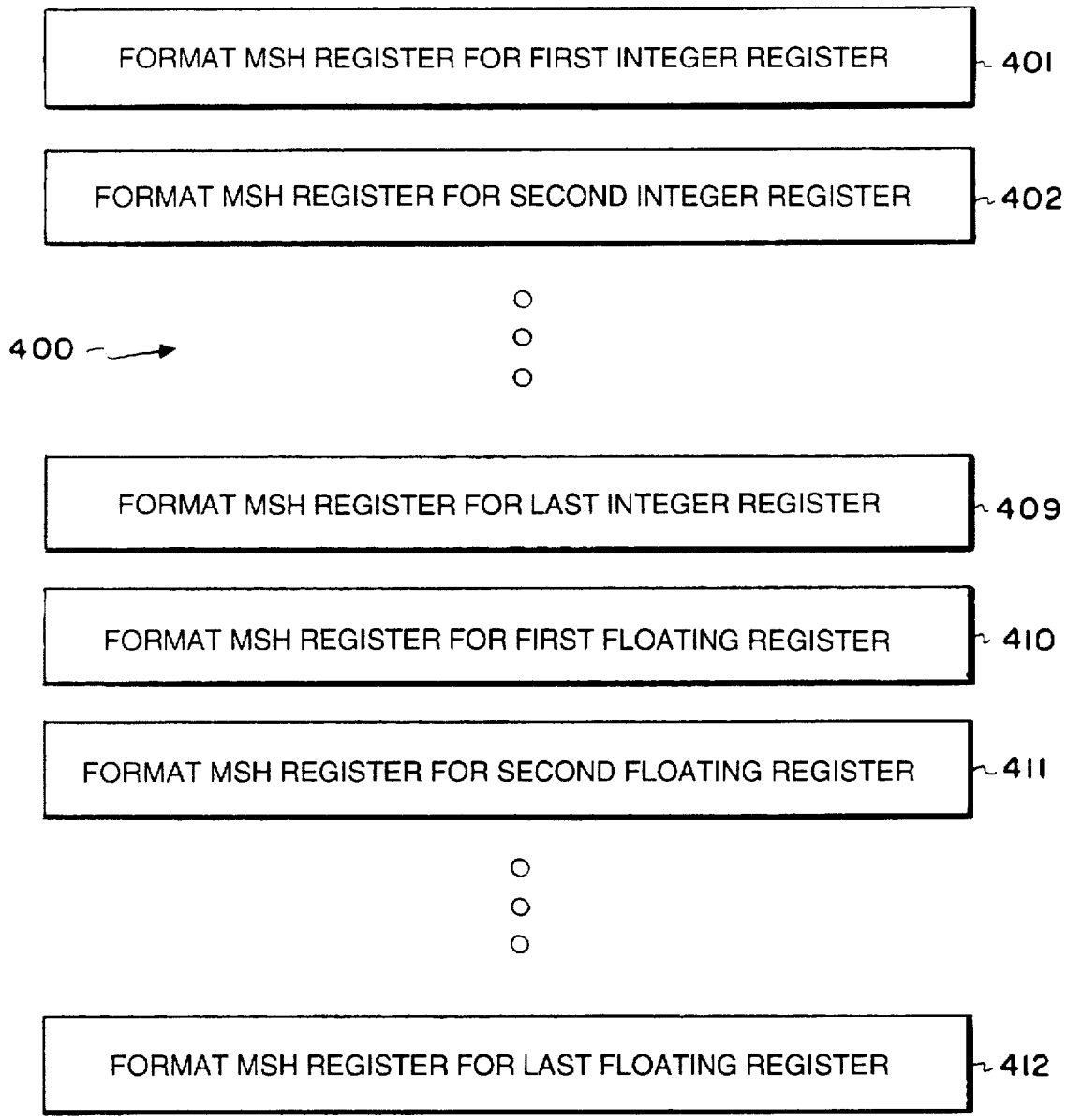
FIG. 4 is a block diagram of a set of format registers associated with the set of inverted MSH registers of FIG. 3.

FIG. 4 shows the set of inverted format MSH registers 400. For example, there is one format MSH register for each of the address MSH registers of FIG. 3. The format MSH registers 401–419 are used to store information describing the format of the missing data. This information is used to format the data when the data are transferred from the source, e.g., the cache 102, to the destination, e.g., the registers. Formatting may involve masking and shifting bytes to align the data with predetermined register formats.

The inverted MSH registers according to the invention, in contrast with known MSH registers, have no restrictions on the number of missing blocks which can concurrently be managed. Nor are there any limitations on the number of misses per block of cache data, as in the case of prior art non-inverted MSH registers. Therefore, with the inverted MSH registers of the present invention cache lock-up is reduced.

Figure 5:
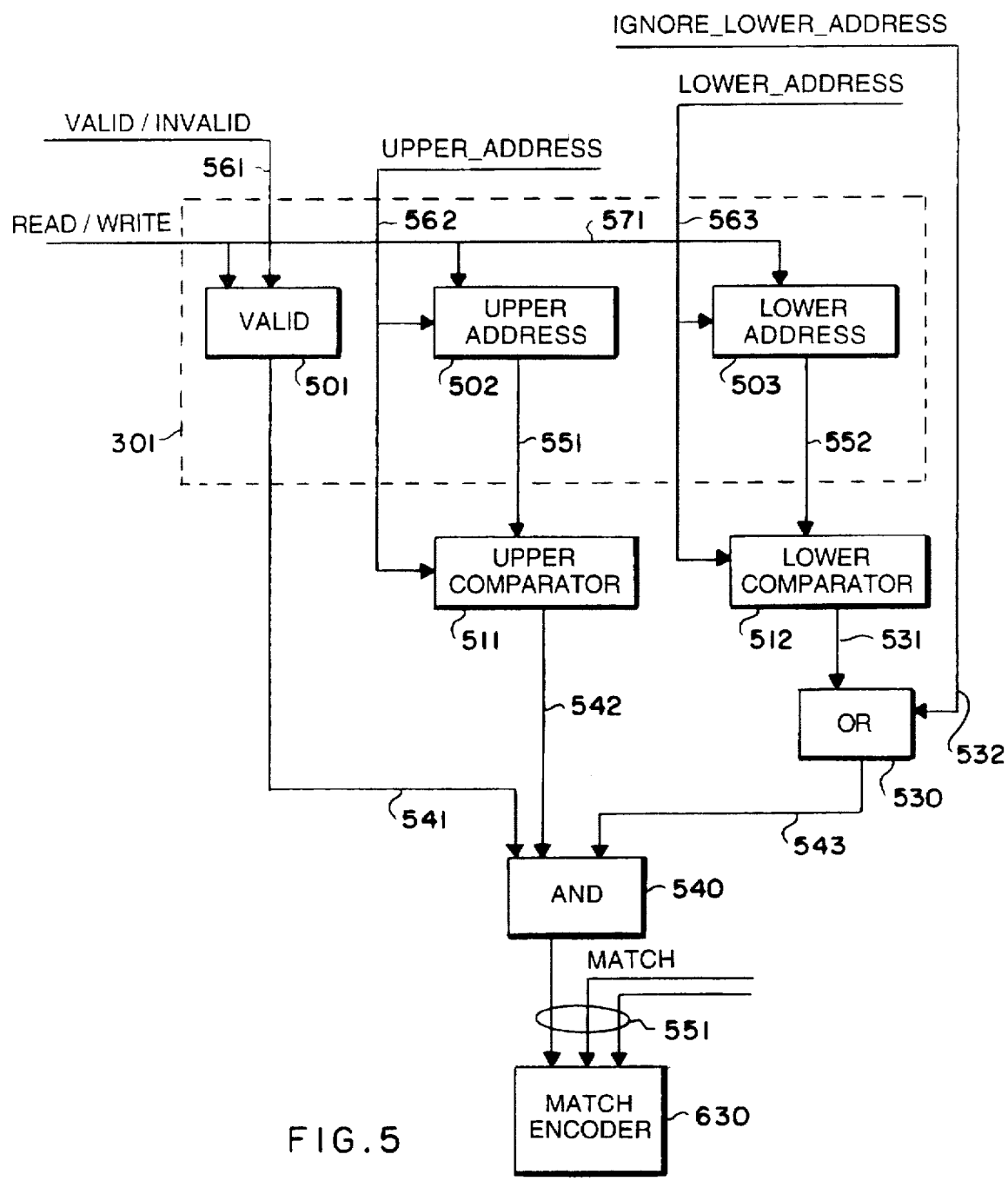
FIG. 5 is a detailed block diagram of a single inverted MSH register including control circuits.

FIG. 5 shows a circuit including one of the inverted address MSH registers 301–319, for example, address MSH register 301. The address MSH register 301 can include a valid field 501, an upper address field 502 and a lower address field 503. The output of the address fields 502 and 503 are respectively coupled to upper and lower comparators 511 and 512 by lines 551 and 552. The output of the lower address field is coupled to a first input of an OR circuit 530 by line 531. The second input of the OR circuit 530 can receive an IGNORE$_{13}$LOWER$_{13}$ADDRESS signal on line 532.

The outputs of the valid field 501, the upper comparator 511, and the OR circuit 530 are coupled to the inputs of an AND circuit 540 by lines 541–543. The output of the AND circuit 540, a MATCH signal is coupled to a match encoder 630 by one of the lines 551. The match encoder 630, described in greater detail below, can receive MATCH signals on lines 551 from any of the address MSH registers 301—319.

The basic operations which can be performed by the circuit of FIG. 5, are writing and associative comparing. The operation of writing may include the operation of invalidating. Writing occurs when a miss condition is detected, for example on one of the control lines of FIG. 2, and miss status information has not yet been stored in the address MSH registers 300. To write status data to the inverted MSH registers, the associated address and format MSH registers corresponding to a destination register are first selected by a selector network, see FIG. 6.

Figure 6:
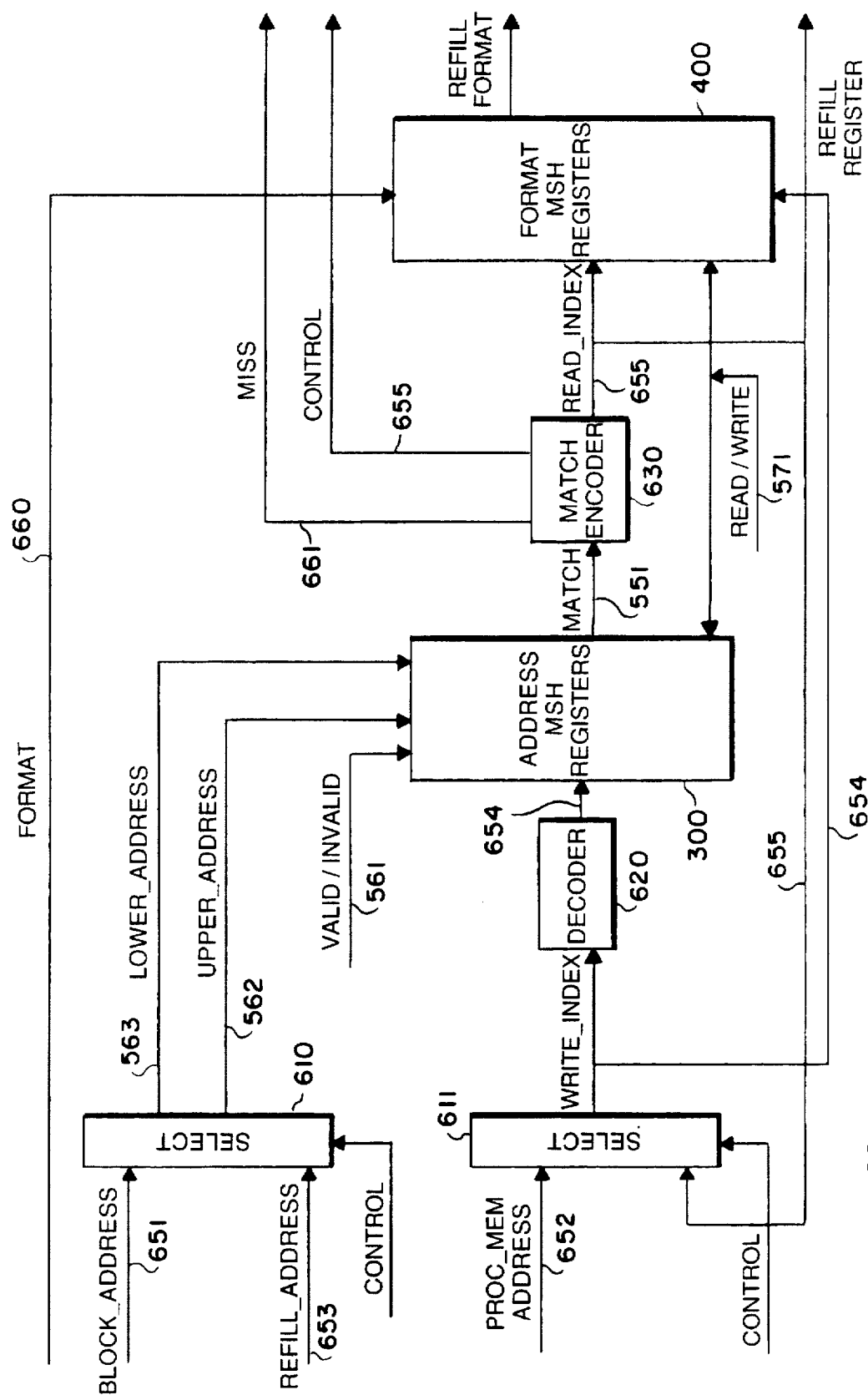
FIG. 6 is a block diagram of the set of inverted MSH and format registers arranged in a network including control circuits.

In FIG. 6, the MSH registers are selected, for example, by supplying a processor memory address (PROC$_{13}$MEM$_{13}$ADDRESS) to a select/decoder network, see line 652, and elements 611 and 620 of FIG. 6, described in greater detail below. The PROC$_{13}$MEM$_{13}$ ADDRESS is the address of the register destined to receive the missing data.

Continuing with FIG. 5, a VALID signal is presented on line 561, and the address of the "missing" cache block is presented on lines 562 and 563 in two parts as an UPPER$_{13}$ADDRESS and as an LOWER$_{13}$ADDRESS signals. A WRITE signal is presented on line 571. The VALID signal can be stored in the valid field 501 as, for example, a logical "1," the block address is stored bit-wise in the upper and lower address fields 502–503.

Associative comparing can be performed to determine if the MSH registers already stores valid status information due to some earlier detected miss. Associative comparing can also be performed after a cache block has been transferred so that the processor memory 101 can be updated using the format information stored in the corresponding format MSH registers 400.

During an associative compare operation, the block address is supplied on the lines 562–563. For certain types of compare operations, as will be described below, the lower address can be ignored, and therefore an IGNORE$_{13}$LOWER$_{13}$ADDRESS signal may be present on line 532. During a compare operation, e.g. a READ signal on line 571, the contents of the fields 501–503 are presented on lines 541, 551–552 to compare the input block address on lines 562–563 with the stored block address fields 502–503 using the comparators 511 and 512. Only if there is a match and the data in the MSH register are valid as indicated on line 541, will a MATCH signal be produced on one of the lines 551.

During an invalidate operation, which may occur after the missing data are stored in the processor memory 101, the MSH register 301 is marked as invalid by asserting an INVALID signal on line 561 and a WRITE signal on line 571, stored as a logical "0" in the valid field 501. The address of the associated processor register is presented on line 655.

The IGNORE$_{13}$LOW$_{13}$ADDRESS signal on line 532 can be used in cache arrangements where the size of the cache "line" or block is larger than the width of the data path used to transfer the block between the next lower memory, e.g., the RAM 103 and the cache 102. In such an arrangement, the cache block is usually transferred as multiple "sub-blocks". Thus, while storing each sub-block in the cache, address granularity must be provided down to the addresses of the sub-blocks within the blocks, e.g., including the LOWER$_{13}$ADDRESS portion, see "REFILL$_{13}$ADDRESS" on line 653 of FIG. 6. However, during the initial probe of the inverted MSH registers, in response to detecting a miss condition, only the UPPER$_{13}$ADDRESS portion, see "BLOCK$_{13}$ADDRESS" on line 651 of FIG. 6, needs to be checked, and the lower portion of the address, e.g., the addresses of the sub-blocks within the block, can be ignored by asserting the IGNORE$_{13}$LOW$_{13}$ADDRESS signal.

FIG. 6 shows the MSH register arrangement 200 of FIG. 2 in greater detail. The arrangement 200, in addition to the sets of inverted MSH registers 300 and 400 (including the control circuits of FIG. 5), also includes a first select network 610 and a second select network 611, a decoder network 620, and the match encoder 630. The first select network 610 is coupled to the address MSH registers by lines 562 and 563. The second select network 611 is coupled to the MSH registers 300 and 400 via the decoder 620 and line 654 for carrying the WRITE$_{13}$INDEX signal. Format information is supplied to the format MSH registers via line 660.

The following described the operations which can be performed by the arrangement 200. First, upon detection of a miss condition, the set of MSH registers 300 can be searched and associatively compared to determine if any of the MSH registers 300 have already been allocated for holding miss status information for the current miss address. A signal BLOCK$_{13}$ADDRESS is supplied as an input to the first select circuit 610 on line 651. The output of the first select network 610 are the UPPER$_{13}$ADDRESS and LOWER$_{13}$ADDRESS signals on lines 562 and 563. The signal IGNORE$_{13}$LOW$_{13}$ADDRESS is asserted to a logical true value.

The result of the associative comparing operations, as described above with reference to FIG. 5, are supplied to the match encoder network 630 as MATCH signals on lines 551. If no MATCH signal is detected, a MISS signal on line 661 can be sent to the next lower level of memory, for example, the RAM 103 to initiate the transfer of the block of cache data including the requested data. If at least one MATCH signal is detected, a CONTROL signal is asserted on line 655. This signal indicates that the missing block has already been requested from the next lower level of the memory hierarchy, and therefore does not need to be requested at this time.

Second, whether there is a match or not, the status information needs to be written to the corresponding address and format MSH registers. The writing of the address information is described above with reference to FIG. 5. The format information can be supplied by a FORMAT signal on line 660. The address of the associated processor register is supplied on line 652.

Third, after the block has been transferred to the cache memory 102, the requested data can be supplied to the processor memory 101 to "refill" the corresponding processor registers. This operation also requires an associative search or reading of the MSH registers as described for FIG. 5. The refill address is presented on line 653, as described above. During refill, the IGNORE$_{13}$LOWER$_{13}$ADDRESS signal is asserted as a FALSE logical value. The match encoder 630 generates a READ INDEX on line 655 corresponding to the processor register to be refilled in turn, which is fed back to the second select circuit 611 to invalidate the associated inverted MSH register. During refill of the processor registers, the now available data can be formatted as indicated in the corresponding format register.

Fourth, after processor register has been refilled, that, is the data have been stored in the processor register, the corresponding inverted MSH register is "invalidated" as described with reference to FIG. 5.

The invention is not limited by the embodiments shown in the drawings and detailed in the description, which is given by way of example, and not of limitation, but only in accordance with the scope of the appended claims.

We claim:

1. A hierarchical memory arrangement for use with a computer system including a main memory, a cache memory, and a processor having a set of processor registers, comprising:

a set of status registers, there being one status register corresponding to each processor register;

means, responsive to the processor requesting the transfer of data stored in the cache memory at a source address to one of the processor registers having a destination address, for determining a miss condition of the data stored at the source address;

means, responsive to detecting the miss condition, for selecting a particular status register corresponding to the one processor register having the destination address wherein the source address is stored in said particular status register which corresponds to the destination address; and means for storing the source address in the particular status register corresponding to the one processor register having the destination address, and for initiating the transfer of the data from the main memory to the cache memory at the source address while allowing the processor to request the transfer of additional data from the cache memory at different source addresses to the set of processor registers.

2. The hierarchical memory arrangement of claim 1, further comprising:

a set of format registers, there being one format register corresponding to each processor register, the one format register for storing a format of data to transfer to the one processor register;

means for selecting a particular format register corresponding to the one processor register having the destination address; and means for storing the data in the one processor register according to the format stored in the particular format register while transferring the data from the main memory to the cache memory at the source address.

3. The hierarchical memory arrangement of claim 2 further comprising:

a selection network connected to the set of status registers and the set of format registers, the selection network including a set of comparators, there being one comparator connected to each status register, the selection network receiving the destination address to select the particular status and format registers, and the selection network receiving the source address upon detecting the miss condition to determine whether to transfer the data from the main memory to the cache memory at the source address.

4. The hierarchical memory arrangement of claim 2 further comprising:

means for storing a valid signal in the particular status register when storing the source address; and means for storing an invalid signal in the particular status register upon the completion of transferring the data from the main memory to the cache memory at the source address, and from the cache memory to the one processor register.

5. The hierarchical memory arrangement of claim 4 further comprising:

means for detecting the valid signal stored in the particular status register when detecting a subsequent miss condition for data stored at the source address of the cache memory while allowing the processor to request the transfer of additional data from the cache memory to the set of processor registers.

6. The hierarchical memory arrangement of claim 5, further comprising:

means, responsive to the processor requesting the transfer of data stored in the cache memory at the source address to another of the processor registers having another corresponding destination address, for determining if the subsequent miss condition is related to the data stored at the source address while transferring the data from the main to the cache at the source address;

means, responsive to detecting the subsequent miss condition, for selecting another particular status register corresponding to the other processor register having the destination address; and means for storing the source address in the other status register corresponding to the other processor register having the other destination address.

7. A method for accessing data in a hierarchical memory arrangement for use with a computer system including a main memory, a cache memory, and a processor having a set of processor registers, comprising:

requesting the transfer of data stored at a source address of the cache memory to one of the processor registers having a destination address;

determining a miss condition of the data stored at the source address;

selecting, in response to detecting the miss condition, a particular status register corresponding to the one processor register having the destination address wherein the source address is stored in said particular status register which corresponds to the destination address;

storing the source address in the particular status register corresponding to one processor register having the destination address; and initiating the transfer of the data from the main memory to the cache memory while allowing the processor to request additional data from the cache memory to the set of processor registers.

8. The method of claim 7, further comprising:

selecting, in response to the miss condition, a particular format register corresponding to the processor register having the destination address, there being one format register for each processor register;

storing a format of data to be transferred to the one processor register in the particular format register; and storing the data stored in the one processor register while transferring data from the main memory to the cache memory.

9. The method claim 8 further comprising:

receiving, by a selection network, the source address upon detecting the miss condition to determine whether to transfer the data from the main memory to the cache memory, the selection network connected to the set of status registers and the set of format registers, the selection network including a set of comparators, there being one comparator connected to each status register for comparing the source addresses stored in the set of status registers.

10. The method of claim 9 further comprising:

storing a valid signal in the particular status register when storing the source address, and storing an invalid signal in the particular status register upon the completion of transferring data from the main memory to the cache memory and the one processor register.

11. The method of claim 10 further comprising:

detecting the valid signal stored in the particular status register when detecting a subsequent miss condition for data stored at the source address of the cache memory while allowing the processor to request the transfer of additional data from the cache memory to the set of processor registers.

12. A method for accessing data stored in a hierarchical memory of a computer system including a processor, the hierarchical memory including a main memory, a cache memory, and processor registers, comprising:

selecting a status register associated with a particular processor register having a destination address if the cache memory does not store required data;

storing, in the selected status register associated with one of the processed registers having the destination address, a source address and format of the required data to transfer from the cache memory to the processor register having the destination address wherein the source address is stored in said particular status register which corresponds to the destination address;

transferring, from the main memory to the cache memory, the required data while allowing continued access to other data of the cache memory by the processor; and storing the required data in the processor register according to the format of the required data while transferring the required data from the main memory to the cache memory.

* * * * *